ated Aug. 29, 1967

3,338,903
PICOLINE SALTS
Hugh T. Harrison, Tulsa, Okla., assignor to The Dow Chemical Company, Midland, Mich., a corporation of Delaware
No Drawing. Filed Mar. 31, 1966, Ser. No. 538,970
7 Claims. (Cl. 260—271)

This is a continuation-in-part of my copending patent application Ser. No. 357,827, filed Apr. 6, 1964, which in turn was a continuation-in-part of my then copending patent application Ser. No. 199,629, filed June 4, 1962, both now abandoned.

The present invention is directed to the novel salts of, on the one hand, hexafluoroarsenic or hexafluorophosphoric acid and, on the other hand, picoline or aminopicoline. Picoline and aminopicoline correspond to the formulae, respectively,

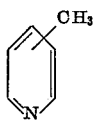

and

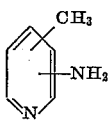

The present salts are waxes or solid crystalline materials, of low solubility in organic solvents and of moderate solubility in water. They are useful as parasiticides, and are adapted to be employed in the control of insect, bacterial, fungal, and helminth pests, such as *Ascaris lumbricoides* var. *suum*, California red scale, two-spotted spider mite, bean aphid, and lone star tick; they are also useful when employed as agents to inhibit the nitrification of ammonium-nitrogen-containing compounds or reduced nitrogen fertilizers in soil.

The novel compounds are prepared by reacting picoline or aminopicoline with hexafluoroarsenic or hexafluorophosphoric acid. Conveniently, the reaction is carried out in an inert liquid reaction medium, such as water. The reaction is exothermic and takes place smoothly at temperatures of from —10° to 80° C.

Good results are obtained when substantially stoichiometric amounts of the reagents are employed; that is, when picoline is reacted with the hexafluorophosphoric or hexafluoroarsenic acid, equimolecular proportions are employed wth good results; and when aminopicoline is reacted with the hexafluorophosphoric or hexafluoroarsenic acid, good results are obtained when employing one molecular proportion of the aminopicoline and a number of molecular proportions of hexafluorophosphoric or hexafluoroarsenic acid equivalent to the number of nitrogen atoms that are to be quaternized in the desired product. Thus, when a mono hexafluorophosphate or hexafluoroarsenate of aminopicoline is to be prepared, good results are obtained when employing equimolecular proportions of reactants; when a bis(hexafluorophosphate or hexafluoroarsenate) is to be prepared, good results are obtained when employing one molecular proportion of aminopicoline and two molecular proportions of hexafluorophosphoric or hexafluoroarsenic acid.

The hexafluorophosphoric or hexafluoroarsenic acid reactant is usually supplied to the reaction mixture as a liquid. Conveniently, the liquid employed is the commercial product which contains 65 percent $HPF_6$, 21 percent $H_2O$, and 14 percent related phosphorus acids, or the commercial product which contains 65 percent $HAsF_6$, 21 percent $H_2O$, and 14 percent related arsenic acids. In other procedures, a liquid containing one of the acids is prepared in the manner of Nuttall et al. in their preparation of an aqueous solution of hexafluorophosphoric acid. See The Journal of the Chemical Society (London), 1960, pages 4965–4970. In yet other procedures, it is sometimes convenient to employ the hydrate form of the acid.

In carrying out the reaction, the picoline or aminopicoline compound is contacted with the acid in any conventional manner. The contacting is conveniently carried out by adding one reactant to the other reactant. The temperature of the resulting reaction mixture can be controlled by regulating the rate of the contacting of the reactants as well as by external cooling. Sometimes the desired product precipitates in the mixture during the reaction. Where desirable to maintain fluid condition such product can in part be separated by conventional procedures. Upon completion of the contacting of the reactants, most of the reaction will have taken place with the production of the desired product. Where optimum yields are desired, it is often convenient that the reaction mixture be allowed to stand several hours. Upon completion of the reaction, the solvent can be removed from the reaction mixture by evaporation or distillation under reduced pressure to obtain the salt product as a residue. This product can be further purified by conventional procedures such as washing with water or suitable organic liquid and recrystallization.

Example 1.—3-picoline hexafluorophosphate 23.3 grams of 3-picoline (0.16 mole) are added portionwise and with stirring to an aqueous 65 percent solution of hexafluorophosphoric acid (equivalent to 29.2 grams; 0.20 mole of $HPF_6$). The addition is carried out at room temperature and over a period of one hour. Following the completion of the addition, the reaction mixture is concentrated by heating at a temperature of about 100° C. to drive off water. The concentrated reaction mixture is thereafter dried under vacuum and the resulting liquid product mixture filtered to obtain the 3-picoline hexafluorophosphate product as a residue. This product is found to be a clear wax melting at from 55° to 57° C.

Examples 2–12

In a similar manner, other products of the present invention are prepared as follows:

6-amino-2-picoline hexafluorophosphate (melting at 91–92° C.) by reacting together 6-amino-2-picoline and hexafluorophosphoric acid.

2-picoline hexafluoroarsenate (having a molecular weight of 283.1 and melting at 80–81° C.) by reacting together 2-picoline and hexafluoroarsenic acid.

2-amino-4-picoline bis(hexafluorophosphate) (melting at from 111° to 114° C.) by reacting together 2-amino-4-picoline and hexafluorophosphoric acid.

5-amino-3-picoline hexafluoroarsenate (molecular weight of 298.1) by reacting together 5-amino-3-picoline and hexafluoroarsenic acid.

4-picoline hexafluoroarsenate (melting at 133–136° C.) by reacting together 4-picoline and hexafluoroarsenic acid.

4-picoline hexafluorophosphate (having a molecular weight of 239.1 and melting at 110–112° C.) by reacting together 4-picoline and hexafluorophosphoric acid.

2-picoline hexafluorophosphate (melting at 86–88° C.) by reacting together 2-picoline and hexafluorophosphoric acid.

6-amino-2-picoline hexafluoroarsenate (melting at 88–90° C.) by reacting together 6-amino-2-picoline and hexafluoroarsenic acid.

4-amino-3-picoline bis(hexafluorophosphate) (molecular weight of 400.1) by reacting together one molecular proportion of 4-amnio-3-picoline and two molecular proportions of hexafluorophosphoric acid.

3-picoline hexafluoroarsenate (melting at 40–42° C.) by reacting together 3-picoline and hexafluoroarsenic acid.

2-amino-4-picoline hexafluoroarsenate (melting at 81–83° C.) by reacting together 2-amino-4-picoline and hexafluoroarsenic acid.

The present compounds are useful as parasiticides in various insecticidal, nematocidal and antimicrobial compositions. For such use, the unmodified compounds can be employed. However, the present invention also encompasses the use of the compounds together with a parasiticide adjuvant. In such uses, the compounds can be dispersed upon a finely divided solid and the resulting preparations employed as dusts. Also, such mixtures can be dispersed in water with the aid of a wetting agent and the resulting aqueous suspensions employed as sprays. In other procedures, the products can be employed as constituents of organic liquid compositions, oil-in-water or water-in-oil emulsions or water dispersions with or without the addition of wetting, dispersing or emulsifying agents. In representative practices, 3-picoline hexafluorophosphate gives 100 percent control of *Ascaris lumbricoides* var. *suum* in animals heavily infested therewith when the compound is supplied at a concentration of 0.06 percent by weight in the diet of the said animals.

The compounds of the puresent invention are useful as additives to liquids to prevent the corrosive action of the liquids on steel. In this application, the compounds inhibit the corrosion otherwise affected by liquids such as brine, sweet brine, sour brine, hydrochloric acid, and the like. In addition, the compounds give good results as agents to inhibit the swelling of clay materials in contact with aqueous solutions. In this application, the compounds are dispersed in the solutions in an inhibiting amount, such as 0.3 percent or more of the compound or compounds by weight of ultimate aqueous solution.

*Example 13*

Various of the subject compounds, as well as pyridine hexafluorophosphate, were evaluated for their efficiency to inhibit the corrosion of steel when exposed to sour brine. In this operation, a brine solution comprising 5 percent sodium chloride, 0.25 percent acetic acid, and 94.75 percent water was prepared. Thereafter, this solution was flushed consecutively for two hours with nitrogen, for an additional two hours with hydrogen sulfide, and then briefly with nitrogen gas. Similarly, a quantity of kerosene was flushed for two hours with nitrogen, two hours with hydrogen sulfide, and briefly with nitrogen. Thereafter, the treated kerosene and treated birne were mixed together, in the ratio of 9 parts of brine to one part of kerosene, to obtain a sour brine. Each compound being evaluated was dispersed in a separate portion of the brine, and another portion of the brine was left untreated. A weighed piece of 20 gauge 1020 cold rolled steel was placed in each portion of brine, the piece in the untreated portion serving as a control. These mixtures, in sealed containers, were placed on a rotating machine, the movement of which alternately exposed the steel piece to the effects of the various portions of the mixture; the machine was also capable of maintaining the containers at elevated temperatures. Rotation was begun and the temperature raised to 175° F. These conditions were continued and maintained for sixteen hours; the containers were then removed and opened, and the steel pieces removed, cleaned with acetone, dried, and re-weighed.

Percent protection against corrosion was calculated by the formula:

Percent protection =

$$\frac{(\text{Average weight loss of control} - \text{weight loss of test coupon}) \times 100}{(\text{Average weight loss of control})}$$

The compounds thus evaluated and the results obtained are set forth in the following table:

| | Percent protection |
|---|---|
| Pyridine hexafluorophosphate | [1]None |
| 3-picoline hexafluoroarsenate | 68 |
| 4-picoline hexafluoroarsenate | 71 |
| 2-amino-4-picoline hexafluorophosphate | 41 |
| 2-amino-4-picoline hexafluoroarsenate | 65 |
| 6-amino-2-picoline hexafluoroarsenate | 63 |

[1] Corrosion was accelerated by 36 percent.

I claim:
1. A salt of a member of the group consisting of hexafluoroarsenic acid and hexafluorophosphoric acid and a member of the group consisting of picoline and aminopicoline.
2. The compound of claim 1 which is 4-picoline hexafluoroarsenate.
3. The compound of claim 1 which is 6-amino-2-picoline hexafluorophosphate.
4. The compound of claim 1 which is 3-picoline hexafluoroarsenate.
5. The compound of claim 1 which is 6-amino-2-picoline hexafluoroarsenate.
6. The compound of claim 1 which is 2-amino-4-picoline hexafluoroarsenate.
7. The compound of claim 1 wherein the acid is hexafluoroarsenic acid.

References Cited

UNITED STATES PATENTS

| 1,915,334 | 6/1933 | Salzberg et al. | 260—290 |
| 2,362,614 | 11/1944 | Calva | 167—22 |
| 3,189,428 | 6/1965 | Mussell | 71—2.2 |

OTHER REFERENCES

Lange et al., Ber. Deut. Chem. vol. 63B pp. 1058, 1059, 1062, 1068 and 1069 (1930).

Van Wazer, "Phosphorus and Its Compounds, vol. I," Interscience 1958, pp. 803, 804, 808 and 809.

ALEX MAZEL, *Primary Examiner.*

DONALD G. DAUS, *Assistant Examiner.*